(12) United States Patent
Morlock et al.

(10) Patent No.: US 10,012,259 B2
(45) Date of Patent: Jul. 3, 2018

(54) DRIVE SHAFT FOR MOTOR VEHICLES AND METHOD FOR MANUFACTURING A DRIVE SHAFT OF THIS TYPE

(71) Applicants: FELSS ROTAFORM GMBH, Bretten-Goelshausen (DE); IFA - TECHNOLOGIES GMBH, Haldensleben (DE)

(72) Inventors: Eckhard Morlock, Koenigsbach-Stein (DE); Andreas Haerter, Niefern-Oeschelbronn (DE); Gerald Langer, Buelstringen (DE)

(73) Assignees: Felss Rotaform GmbH, Bretten-Goelschausen (DE); IFA - Technologies GmbH, Haldensleben (DE)

( * ) Notice: Subject to any disclaimer, the term of this patent is extended or adjusted under 35 U.S.C. 154(b) by 122 days.

(21) Appl. No.: 15/073,919

(22) Filed: Mar. 18, 2016

(65) Prior Publication Data

US 2016/0273575 A1   Sep. 22, 2016

(30) Foreign Application Priority Data

Mar. 19, 2015   (EP) .................................... 15159886

(51) Int. Cl.
*F16C 3/02*   (2006.01)
*B21K 1/06*   (2006.01)

(52) U.S. Cl.
CPC ................ *F16C 3/02* (2013.01); *B21K 1/063* (2013.01); *F16C 2326/06* (2013.01)

(58) Field of Classification Search
CPC .......... F16C 3/02; F16C 2326/06; B21K 1/063
USPC ......................... 464/183; 280/777; 72/370.25
See application file for complete search history.

(56) References Cited

U.S. PATENT DOCUMENTS

| 3,599,757 A | 8/1971 | Takamatsu |
| 6,371,859 B1 * | 4/2002 | Gibson ...................... F16C 3/02 464/183 |
| 6,666,772 B1 * | 12/2003 | Cheney ................. B60B 35/127 464/183 |

FOREIGN PATENT DOCUMENTS

| DE | 10 2004 005096 | 8/2005 |
| EP | 0 557 733 | 9/1993 |
| GB | 2 358 902 | 8/2001 |
| WO | WO 2005/018974 | 3/2005 |

* cited by examiner

*Primary Examiner* — Greg Binda
(74) *Attorney, Agent, or Firm* — Collard & Roe, P.C.

(57) ABSTRACT

A drive shaft for motor vehicles comprises shaft portions arranged one after the other in s longitudinal direction of the drive shaft. One shaft portion is a tubular shaft portion having a large cross section and another shaft portion having a cross section that is smaller than the tubular shaft portion having a large cross section. A transition region having a region wall is provided between the tubular shaft portion and the shaft portion having the smaller cross section. If the drive shaft is compressed in the event of a crash, the shaft portion having the smaller cross section is pushed into the tubular shaft portion having the large cross section by an insertion length, thus deforming or breaking the region wall of the transition region.

10 Claims, 3 Drawing Sheets

DRIVE SHAFT FOR MOTOR VEHICLES AND METHOD FOR MANUFACTURING A DRIVE SHAFT OF THIS TYPE

CROSS-REFERENCE TO A RELATED APPLICATION

The invention described and claimed hereinbelow is also described in European Patent Application EP 15 159 886.9, filed on Mar. 19, 2015. The European Patent Application, the subject matters of which is incorporated herein by reference, provides the basis for a claim of priority of invention under 35 U.S.C. 119(a)-(d).

BACKGROUND OF THE INVENTION

The present invention relates to a drive shaft for motor vehicles with shaft portions arranged one after the other in the longitudinal direction of the drive shaft. One shaft portion is a tubular shaft portion having a larger cross section and another shaft portion is a shaft portion having a smaller cross section. The shaft portion having the larger cross section is arranged, when the drive shaft is in an initial state, on one side of an annular transition region of the drive shaft and the shaft portion having the smaller cross section is arranged on the other side. The annular transition region includes a region wall that interconnects the shaft portion having the larger cross section and the shaft portion having the smaller cross section. The shaft portion having the larger cross section and the shaft portion having the smaller cross section are able to move relative to one another, under the action of a longitudinal force which acts on the shaft portion having the larger cross section and/or on the shaft portion having the smaller cross section in the longitudinal direction of the drive shaft and compresses the drive shaft starting from the initial state, in the longitudinal direction of the drive shaft and the region wall of the transition region between the shaft portion having the larger cross section and the shaft portion having the smaller cross section, forming a predetermined deformation point and/or a predetermined breaking point. The shaft portion having the smaller cross section has an insertion length which is arranged outside the shaft portion having the larger cross section when the drive shaft is in the initial state and extends in the longitudinal direction of the drive shaft and by which the shaft portion having the smaller cross section can be pushed into the shaft portion having the larger cross section when the drive shaft is compressed, thus deforming and/or breaking the region wall of the transition region arranged between the shaft portion having the larger cross section and the shaft portion having the smaller cross section. The shaft portion having the smaller cross section is guided inside the shaft portion having the larger cross section in the direction of movement when the shaft portion having the larger cross section and the shaft portion having the smaller cross section move relative to one another when the drive shaft is compressed.

The invention further relates to a method for manufacturing a drive shaft for motor vehicles, in which a plastically deformable tubular shaft blank is formed, thus forming a shaft portion having a larger cross section, a shaft portion having a smaller cross section that follows the shaft portion having the larger cross section in the longitudinal direction of the drive shaft when the drive shaft is in an initial state, and a transition region provided between the shaft portion having the larger cross section and the shaft portion having the smaller cross section. The transition region is produced to have a region wall that interconnects the shaft portion having the larger cross section and the shaft portion having the smaller cross section and that forms a predetermined deformation point and/or a predetermined breaking point under the action of a longitudinal force that acts on the shaft portion having the larger cross section and/or on the shaft portion having the smaller cross section in the longitudinal direction of the drive shaft and compresses the drive shaft starting from the initial state. The shaft portion having the smaller cross section is produced to have an insertion length which extends in the longitudinal direction of the drive shaft and is arranged outside the shaft portion having the larger cross section when the drive shaft is in the initial state and by which the shaft portion having the smaller cross section can be pushed into the shaft portion having the larger cross section in the event of a movement performed by the shaft portion having the larger cross section and the shaft portion having the smaller cross section relative to one another in the longitudinal direction of the drive shaft when the drive shaft is compressed, thus deforming and/or breaking the region wall of the transition region arranged between the shaft portion having the larger cross section and the shaft portion having the smaller cross section.

Motor vehicles, for example passenger vehicles, are often equipped with a drive shaft of the type mentioned above, which exhibit specific compressive behavior in the event of a crash under the action of an excess axial load caused by the crash, and thus convert impact energy into deformation energy, thereby absorbing said energy.

DE 10 2004 005 096 B3 discloses a generic drive shaft comprising a cylindrical tube portion having a relatively large cross section and a cylindrical tube portion having a relatively small cross section. The two tube portions are arranged one after the other in the longitudinal direction of the drive shaft and are interconnected by a transition portion that tapers from the tube portion having the larger diameter towards the tube portion having the smaller diameter. Inside the tube portions, a tubular piece is pushed, by a partial length, into the tube portion having the smaller diameter from the tube portion having the larger diameter. In the region of their mutual overlap, the tubular piece and the tube portion having the smaller diameter are fixed in place on one another by a press fit, which acts in particular in the axial direction. The part of the tubular piece arranged inside the tube portion having the larger diameter is widened in the radial direction with respect to the partial length of the tubular piece inserted into the tube portion having the smaller cross section so as to form a hollow cylinder, the external diameter of which is slightly smaller than the internal diameter of the tube portion having the larger diameter.

Under the action of an axial load on the drive shaft caused by an accident, the aforementioned drive shaft is compressed. The tube portion having the larger diameter and the tube portion having the smaller diameter move relative to one another in the longitudinal direction of the drive shaft, the tube portion having the smaller diameter being pushed into the tube portion having the larger diameter. The transition portion between the tube portion having the larger diameter and the tube portion having the smaller diameter enables the relative movement of the two tube portions. When the drive shaft is compressed, the transition portion is first deformed and then ultimately breaks, a bead that reduces the wall thickness of the transition portion forms a predetermined breaking point. Together with the tube portion having the smaller cross section, the tubular piece that is pressed onto the tube portion having the smaller diameter moves relative to the tube portion having the larger diameter.

In the process, the hollow cylinder of the tubular piece arranged inside the tube portion having the larger diameter causes the tube portion having the smaller diameter to be guided in the tube portion having the larger diameter in the direction of the relative movement, and thereby prevents the drive shaft from buckling.

SUMMARY OF THE INVENTION

The present invention overcomes the shortcomings of known arts, such as those mentioned above.

One embodiment of the invention provides a drive shaft for motor vehicles having shaft portions arranged one after the other in a longitudinal direction of the drive shaft. One shaft portion of the drive shaft is a tubular shaft portion having a larger cross section and another shaft portion has a smaller cross section. The shaft portion having the larger cross section is arranged, when the drive shaft is in an initial state, on one side of an annular transition region of the drive shaft and the shaft portion having the smaller cross section is arranged on another side. The transition region has a region wall that interconnects the shaft portion having the larger cross section and the shaft portion having the smaller cross section. The shaft portion having the larger cross section and the shaft portion having the smaller cross section are configured to move relative to one another, under the action of a longitudinal force which acts on the shaft portion having the larger cross section and/or on the shaft portion having the smaller cross section in the longitudinal direction of the drive shaft and compresses the drive shaft starting from the initial state, in the longitudinal direction of the drive shaft, and the region wall of the transition region between the shaft portion having the larger cross section and the shaft portion having the smaller cross section forming a predetermined deformation point and/or a predetermined breaking point. The shaft portion having the smaller cross section has an insertion length which is arranged outside the shaft portion having the larger cross section when the drive shaft is in the initial state and extends in the longitudinal direction of the drive shaft and by which the shaft portion having the smaller cross section can be pushed into the shaft portion having the larger cross section when the drive shaft is compressed, thus deforming and/or breaking the region wall of the transition region arranged between the shaft portion having the larger cross section and the shaft portion having the smaller cross section, and the shaft portion having the smaller cross section being guided inside the shaft portion having the larger cross section in the direction of movement when the shaft portion having the larger cross section and the shaft portion having the smaller cross section move relative to one another when the drive shaft is compressed.

Furthermore, the insertion length of the shaft portion having the smaller cross section is provided with a cross-section widening that is molded into the shaft portion having the smaller cross section over a partial length of the insertion length and the cross section of which is larger than the cross section of a remaining length of the shaft portion having the smaller cross section, which remaining length extends in the longitudinal direction of the drive shaft on the side of the cross-sectional widening remote from the shaft portion having the larger cross section when the drive shaft is in the initial state, the shaft portion having the smaller cross section guided inside the shaft portion having the larger cross section in the direction of movement by the cross-sectional widening molded into the shaft portion having the smaller cross section when the shaft portion having the larger cross section and the shaft portion having the smaller cross section move relative to one another when the drive shaft is compressed.

Another embodiment of the invention provides a method for manufacturing a drive shaft for motor vehicles, in which a plastically deformable tubular shaft blank is formed, thus forming a shaft portion having a larger cross section, a shaft portion having a smaller cross section that follows the shaft portion having the larger cross section in a longitudinal direction of the drive shaft when the drive shaft is in an initial state, and a transition region provided between the shaft portion having the larger cross section and the shaft portion having the smaller cross section.

The method include producing the transition region to have a region wall that interconnects the shaft portion having the larger cross section and the shaft portion having the smaller cross section and that forms a predetermined deformation point or a predetermined breaking point under action of a longitudinal force that acts on the shaft portion having the larger cross section or on the shaft portion having the smaller cross section in the longitudinal direction of the drive shaft and compresses the drive shaft starting from the initial state; producing the shaft portion having the smaller cross section to have an insertion length which extends in the longitudinal direction of the drive shaft and is arranged outside the shaft portion having the larger cross section when the drive shaft is in the initial state and by which the shaft portion having the smaller cross section can be pushed into the shaft portion having the larger cross section in an event of a movement performed by the shaft portion having the larger cross section and the shaft portion having the smaller cross section relative to one another in the longitudinal direction of the drive shaft when the drive shaft is compressed, thus deforming or breaking the region wall of the transition region arranged between the shaft portion having the larger cross section and the shaft portion having the smaller cross section; and molding a cross-sectional widening into the shaft portion having the smaller cross section over at least a partial length of the insertion length, wherein a cross section of the cross-sectional widening is larger than a cross section of a remaining length of the shaft portion having the smaller cross section, which remaining length extends in the longitudinal direction of the drive shaft on a side of the cross-sectional widening remote from the shaft portion having the larger cross section when the drive shaft is in the initial state, wherein the cross-sectional widening so molded guides the shaft portion having the smaller cross section inside the shaft portion having the larger cross section in the direction of movement when the shaft portion having the larger cross section and the shaft portion having the smaller cross section move relative to one another when the drive shaft is compressed.

In the invention, in the event of a crash, the mutual guidance of a shaft portion having a relatively large cross section and of a shaft portion having a relatively small cross section when the two shaft portions move relative to one another as the drive shaft is compressed is undertaken directly by the shaft portion having the smaller cross section, into which a cross-sectional widening is molded for this purpose. According to the invention, there is thus no need for an additional component that complicates the design and manufacture of the drive shaft, in order to mutually guide the shaft portion having the larger cross section and the shaft portion having the smaller cross section in the event of a crash. In the initial state, i.e., with a non-deformed drive shaft, the cross-sectional widening of the shaft portion having the smaller cross section, which widening acts as a guide means in the event of a crash, is located outside the shaft portion having the larger cross section, when viewed in the longitudinal direction of the drive shaft. If the drive shaft is compressed under the action of a force acting in the longitudinal direction of the drive shaft, the shaft portion having the smaller cross section is pushed into the shaft portion having the larger cross section, at least by the cross-sectional widening, in the longitudinal direction of the drive shaft. The distance, existing as a result of the cross-sectional difference in the transverse direction of the drive shaft, between the outside of the cross-sectional widening of the shaft portion having the smaller cross section and the inside of the shaft portion having the larger cross section, is sized to bring about the desired guide action when the two shaft portions move relative to one another. Zero-play guidance in the direction of movement is not completely necessary. Instead, by appropriately selecting the difference between the cross section of the shaft portion having the larger cross section and the cross section of the cross-sectional widening on the shaft portion having the smaller cross section, the invention provides for a limited tiltability of the shaft portion having the smaller cross section guided inside the shaft portion having the larger cross section.

The limited tiltability of the shaft portion having the smaller cross section enables a guided relative movement of the shaft portion having the larger cross section and the shaft portion having the smaller cross section even when the line of action of the longitudinal force acting on the drive shaft as a result of a crash does not extend precisely in the longitudinal direction of the drive shaft, but rather inclined at an acute angle to the longitudinal direction of the drive shaft. In the longitudinal direction of the drive shaft, the cross-sectional widening is extendible over the entire insertion length of the shaft portion having the smaller cross section. However, a cross-sectional widening that is shorter than the insertion length of the shaft portion having the smaller cross section also is conceivable. The cross-sectional shape of the shaft portion having the larger cross section, and of the shaft portion having the smaller cross section is preferably circular, but is not limited thereto, i.e., the smaller cross section may differ from a circular shape without deviating from the scope or spirit of the invention.

The drive shaft according to the invention is preferably manufactured starting from a tubular shaft blank readily available as a semi-finished product. By forming the plastically deformable shaft blank, the shaft portion having the smaller cross section is produced, inter alia, into which the cross-sectional widening acts as a guide, is molded over at least a partial length of the insertion length of the shaft portion having the smaller cross section.

In one form, the shaft portion of the drive shaft has a smaller cross section to consist of a solid material. In an embodiment, a shaft portion having a smaller cross section is provided that is tubular at least in the region of the cross-sectional widening of the insertion length and comprises a portion wall that extends in the longitudinal direction of the drive shaft and into which the cross-sectional widening of the insertion length is molded. In particular, in terms of production, an at least partly tubular shaft portion with a smaller cross section has advantages over a shaft portion made of a solid material.

In an embodiment of the inventive method, the cross-sectional widening of the insertion length of the shaft portion having the smaller cross section is molded into the shaft portion having the smaller cross section in a separate processing step. According to the invention, it is preferable for cross-sectional widening of the insertion length of the tube portion having the smaller cross section to be produced concurrently with the production of other parts of the drive shaft. In one form, the cross-sectional widening of the insertion length of the shaft portion having the smaller cross section is produced at the same time as the rest of the shaft portion having the smaller cross section and/or at the same time as the transition region between the shaft portion having the larger cross section and the shaft portion having the smaller cross section.

Preferably, the cross-sectional widening of the insertion length of the tube portion having the smaller cross section is molded into the insertion length of the tube portion having the smaller cross section by rotary swaging.

In another embodiment of the drive shaft, advantageous deformation behavior of the region wall of the transition region between the shaft portion having the larger cross section and the shaft portion having the smaller cross section is achieved by the region wall being curved towards the inside of the drive shaft when the drive shaft is in the initial state.

Preferably, the region wall of the transition region between the shaft portion having the larger cross section and the shaft portion having the smaller cross section is produced by rolling the relevant region of the tubular shaft blank. Rolling is a tried and tested production method that allows the region wall to be designed in a defined manner, in particular, to produce the region wall to have a wall thickness matching the requirements.

In another embodiment, the structure of the drive shaft is characterized by the shaft portion having the larger cross section and the shaft portion having the smaller cross section are mutually guided in a particular functionally reliable manner. The shaft portion having the larger cross section has a circular cross section having an internal diameter D and the cross-sectional widening of the insertion length of the tube portion having the smaller cross section has a circular cross section having an external diameter d. The ratio of external diameter d of the cross-sectional widening of the insertion length of the shaft portion having the smaller cross section to the internal diameter D of the shaft portion having the larger cross section is at least 0.715 and at most 0.958. This diameter ratio creates favorable guiding behavior even when the longitudinal force, under the action of which the drive shaft is compressed in the event of a crash, is not effective precisely axially, but rather has a line of action that extends at an angle to the axis of the drive shaft. This prevents the shaft portion having the smaller cross section from tilting inside the shaft portion having the smaller cross section when force is not applied to the drive shaft precisely axially.

In one form, the drive shaft is a Cardan shaft.

BRIEF DESCRIPTION OF THE DRAWINGS

Further features and advantages of the invention will become apparent from the description of embodiments that follows, with reference to the attached figures, wherein:

FIG. 4b depicts details of section IVb, identified in FIG. 4a; and

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
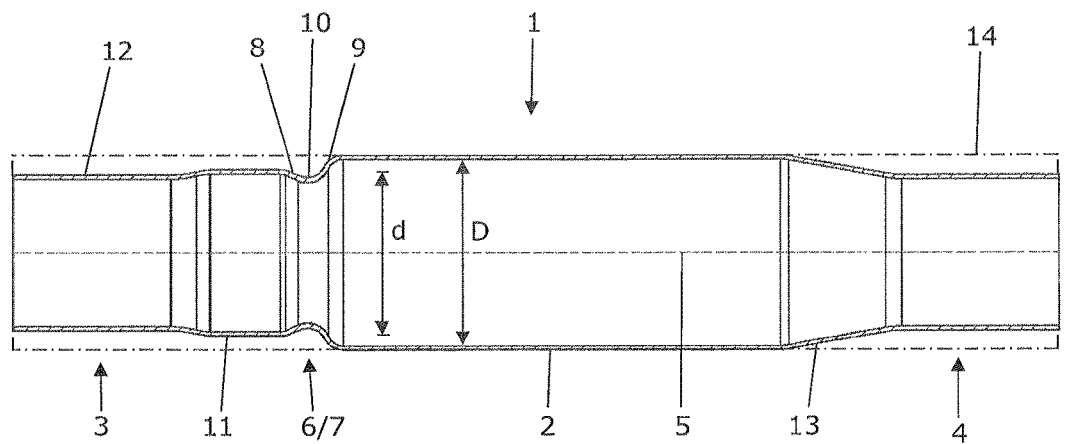
FIG. 1 depicts a drive shaft intended for a passenger vehicle in the initial state.

According to FIG. 1, a drive shaft of a passenger vehicle provided as a Cardan shaft 1 comprises a shaft portion 2 having a larger cross section and shaft portions 3, 4, having smaller cross sections. The shaft portion 2 having the larger cross section and the shaft portions 3, 4 having the smaller cross sections are tubular and have a portion wall having a circular cross-sectional shape. An axis 5 common to the shaft portion 2 having the larger cross section and the shaft portions 3, 4 having the smaller cross sections form the axis of the Cardan shaft 1. The joints to be provided on the two ends of the Cardan shaft 1 are not shown in the drawings for the sake of clarity.

An annular transition region 6 having a region wall 7 is provided between the shaft portion 2 having the larger cross section and the shaft portion 3 having the smaller cross section. The region wall 7 is curved towards the inside of the Cardan shaft 1 and is composed of tapering wall portions 8, 9 and a concave wall portion 10 that connects the tapering wall portions.

A hollow cylindrical cross-sectional widening 11 of the shaft portion 3 having the smaller cross section adjoins the tapering wall portion 8 of the transition region 6. The cross-sectional widening 11 of the shaft portion 3 having the smaller cross section has an external diameter d that is smaller than an internal diameter D of the shaft portion 2 having the larger cross section. The ratio of d:D is at least 0.715 and at most 0.958 and preferably 0.889.

Following the cross-sectional widening 11 in the longitudinal direction of the Cardan shaft 1 towards the free end thereof is a remaining length 12 of the shaft portion 3 having the smaller cross section, where the diameter of the remaining length 12 is smaller than the diameter of the cross-sectional widening 11.

At the opposite end of the shaft portion 2 having the larger cross section, the shaft portion 4 having the smaller cross section is connected to the shaft portion 2 having the larger cross section by a tapering transition region 13. FIG. 1 indicates in dash-dot lines a shaft blank 14 that is in a form of a cylindrical tube and from which the Cardan shaft 1 is produced. The shaft blank 14 consists of a plastically deformable metal material, for example, C22E tempering steel in the example shown. The wall of the shaft blank 14 has a thickness of 1.5 mm; the external diameter of the shaft blank 14 is 75 mm.

To manufacture the Cardan shaft 1, the shaft blank 14 is first worked by rolling. By rolling the relevant region of the shaft blank 14, the concave wall portion 10 of the eventual transition region 6 between the shaft portion 2 having the larger cross section and the shaft portion 3 having the smaller cross section is molded into the wall of the shaft blank 14. As a result of the rolling, the wall thickness of the shaft blank 14 in the region of the concave wall portion 10 of the eventual transition region 6 is reduced from about 1.5 mm to about 1.3 mm.

In the next stage of the method for manufacturing the Cardan shaft 1, the shaft blank 14 worked in this way undergoes infeed rotary swaging. In doing so, the diameter of the shaft blank 14 is reduced from about 75 mm to about 60 mm at both sides of the eventual shaft portion 2 having the larger cross section by a tapering transition region in each case. At the right-hand end of the shaft blank 14 in FIG. 1, the shaft portion 4 having the smaller cross section and the tapering transition region 13 are produced. At the left-hand end in FIG. 1, the shaft blank 14 is formed to form a hollow cylinder of reduced diameter and a tapering transition region having the tapering wall portions 8, 10 and the concave wall portion 10 arranged therebetween. By this tapering transition region, the hollow cylinder of reduced diameter is joined to the portion of the shaft blank 14 that now forms the shaft portion 2 having the larger cross section. A portion of the shaft blank 14, namely the shaft portion 2 having the larger cross section, remains unworked.

The hollow cylinder of reduced diameter and the tapering transition region on the left-hand side of the shaft portion 2 having the larger cross section in FIG. 1, which region connects the hollow cylinder to the shaft portion 2 having the larger cross section, are preferably formed by recess rotary swaging in a further processing step. In the process, the remaining length 12 of the shaft portion 3 having the smaller cross section is maintained from the hollow cylinder of reduced diameter that was produced previously. The remaining hollow cylinder of reduced diameter is formed into the cross-sectional widening 11; the shape that can be seen in FIG. 1 is impressed on the tapering transition region between the hollow cylinder of reduced diameter and the shaft portion 2 having the larger cross section. The Cardan shaft 1 is now in the initial state according to FIG. 1.

FIGS. 2 to 5 illustrate the behavior of the Cardan shaft 1 under an axial load, as can act on the Cardan shaft 1 in the event of a crash, for example. if the passenger vehicle equipped with the Cardan shaft 1 hits an obstacle.

Figure 2:
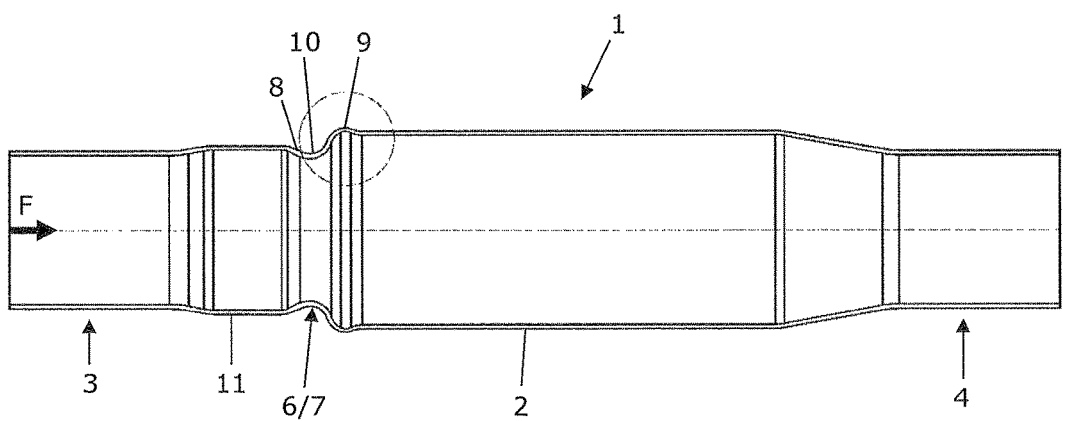
FIG. 2 depicts a phase of the deformation, caused by a crash, of a transition region between a shaft portion having a larger cross section and a shaft portion having a smaller cross section, of the drive shaft according to FIG. 1.

The Cardan shaft 1 is compressed under the action of a longitudinal force F that is indicated in FIG. 2 and acts in the longitudinal direction of the Cardan shaft 1. As a result of the longitudinal force F, the shaft portion 2 having the larger cross section and the shaft portion 3 having the smaller cross section move in opposite directions to one another in the longitudinal direction of the Cardan shaft 1 starting from the initial state according to FIG. 1.

In a first phase of the relative movement of the shaft portion 2 having the larger cross section and the shaft portion 3 having the smaller cross section, the region wall 7 of the transition region 6 provided between the shaft portion 2 having the larger cross section and the shaft portion 3 having the smaller cross section is deformed. The tapering wall portion 9 of the transition region 6 bulges outwards in the process; the concave wall portion 10 of the transition region 6 remains curved towards the inside of the Cardan shaft 1; the tapering wall portion 8 of the transition region 6 substantially retains its original orientation in relation to the cross-sectional widening 11 of the shaft portion 3 having the smaller cross section. This results in the conditions according to FIG. 2.

Figure 3:
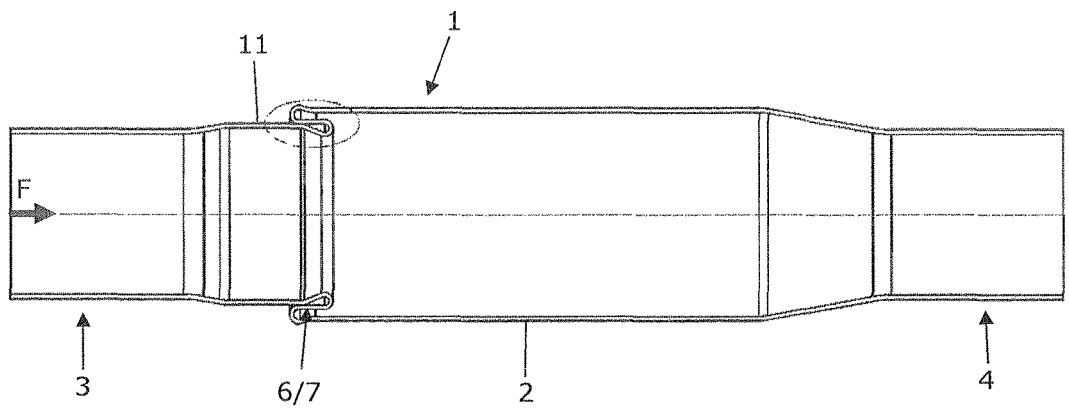
FIG. 3 depicts a phase of the deformation, caused by a crash, of a transition region between a shaft portion having a larger cross section and a shaft portion having a smaller cross section, of the drive shaft according to FIG. 1.
Figure 4A:
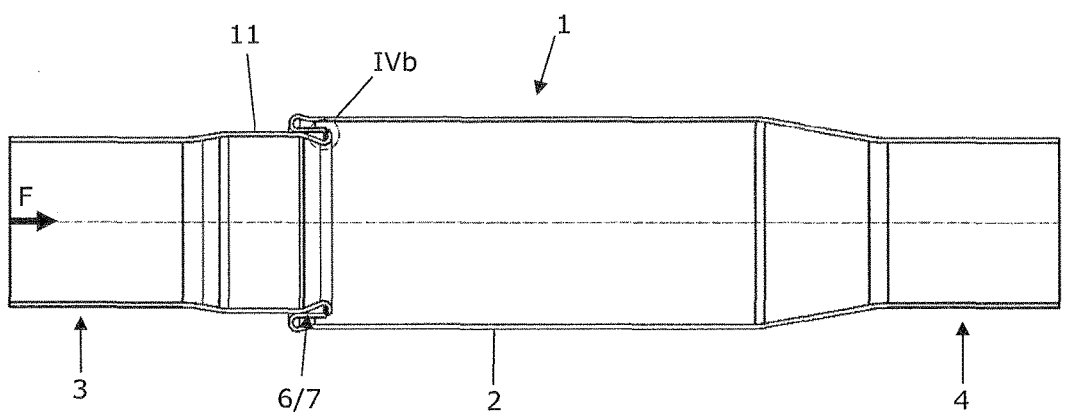
FIG. 4a depicts a transition region between the shaft portion having the larger cross section and the shaft portion having the smaller cross section of the drive shaft according to FIGS. 1, 2 and 3, at a moment when the transition region breaks.
Figure 4B:
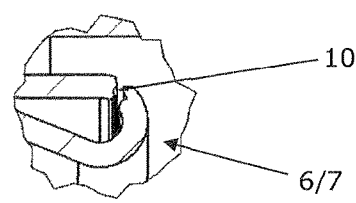

As the shaft portion 2 having the larger cross section and the shaft portion 3 having the smaller cross section continue to move relative to one another, the shaft portion 3 having the smaller cross section is pushed into the shaft portion 2 having the larger cross section under the action of the longitudinal force F. This is accompanied by an S-shaped folding of the region wall 7 of the transition region 6 between the shaft portion 2 having the larger cross section and the shaft portion 3 having the smaller cross section. The shaft portion 2 having the larger cross section envelopes the shaft portion 3 having the smaller cross section, which initially slightly overlaps the shaft portion 2 having the larger cross section in the longitudinal direction of the Cardan shaft 1 by the leading end of the cross-sectional widening 11 (FIG. 3).

Finally, owing to the relative movement of the shaft portion 2 having the larger cross section and the shaft portion 3 having the smaller cross section in the longitudinal direction of the Cardan shaft 1, the region wall 7 of the transition region 6 (FIGS. 4a and 4b) breaks. In this case, the (predetermined) breaking point is located in the region of the concave wall portion 10 of the transition region 6 that has a reduced wall thickness.

As a result of the deformation of the region wall 7 of the transition region 6 between the shaft portion 2 having the larger cross section and the shaft portion 3 having the smaller cross section until the fracture limit is reached, impact energy caused by a crash is converted into deformation energy and thereby absorbed by the Cardan shaft 1.

Figure 5:
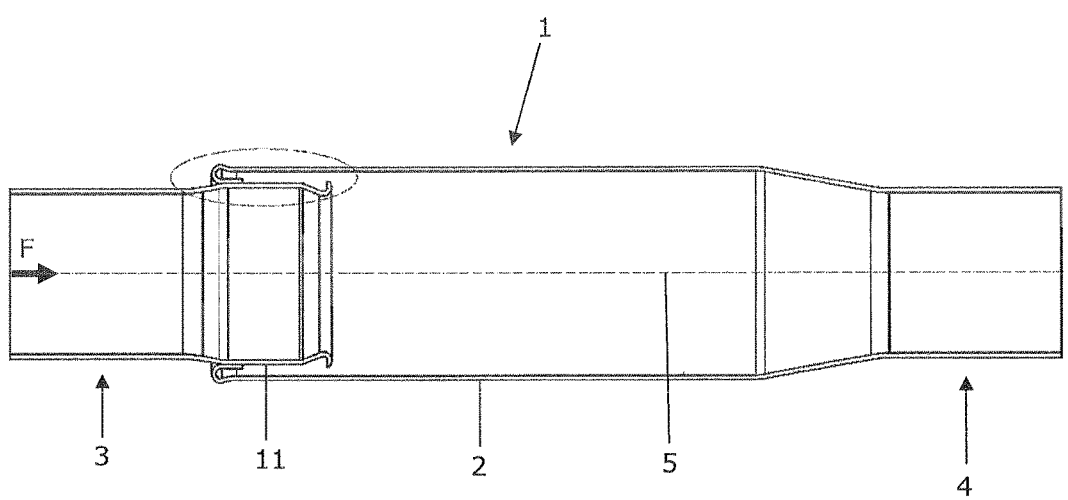
FIG. 5 depicts the drive shaft according to FIGS. 1, 2, 3, 4a and 4b following breakage of the transition region between the shaft portion having the larger cross section and the shaft portion having the smaller cross section with the shaft portion having the smaller cross section pushed into the shaft portion having the larger cross section.

Once the region wall 7 of the transition region 6 has broken, the shaft portion 3 having the smaller cross section is pushed, over its total length acting as an insertion length, into the inside of the shaft portion 2 having the larger cross section along the axis 5 of the Cardan shaft 1. During this insertion movement, the shaft portion 3 having the smaller cross section is guided on the inside of the shaft portion 2 having the larger cross section by the cross-sectional widening 11 extending over a partial length of the insertion length. FIG. 5 shows the shaft portion 2 having the larger cross section and the shaft portion 3 having the smaller cross section at a stage of the insertion movement when the cross-sectional widening 11 of the shaft portion 3 having the smaller cross section has entered the shaft portion 2 having the larger cross section (see encircled region in FIG. 5).

Owing to the larger internal diameter D of the shaft portion 2 having the larger cross section compared with the external diameter d of the cross-sectional widening 11 of the shaft portion 3 having the smaller cross section, the shaft portion 3 having the smaller cross section can tilt slightly in the process. In other words, the shaft portion 3 having the smaller cross section can orient itself at a slight acute angle to the axis 5 of the Cardan shaft 1. However, the possible tilted position of the shaft portion 3 having the smaller cross section is limited because of the selected diameter ratio d:D and thus does not prevent the shaft portion 3 having the smaller cross section from being completely pushed into the shaft portion 2 having the larger cross section. Instead, the shaft portion 3 having the smaller cross section is guided with play in a transverse direction of the axis 5 of the Cardan shaft 1 when the shaft portion 3 having the smaller cross section is pushed into the inside of the shaft portion 2 having the larger cross section over its insertion length—over its entire length in the example shown.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A drive shaft for motor vehicles formed with shaft portions arranged one after the other in a longitudinal direction of the drive shaft, the drive shaft comprising:
   a tubular shaft portion with a large cross section; and
   a shaft portion having a smaller cross section than the large cross section of the tubular shaft portion;
   wherein the shaft portion having the large cross section is arranged, when the drive shaft is in an initial state, on one side of an annular transition region of the drive shaft and the shaft portion having the smaller cross section is arranged on another side of the annular transition region;
   wherein the annular transition region comprises a region wall that interconnects the tubular shaft portion having the large cross section and the shaft portion having the smaller cross section;
   wherein the tubular shaft portion having the large cross section and the shaft portion having the smaller cross section move relative to one another, under action of a longitudinal force imposed on the tubular shaft portion having the large cross section or on the shaft portion having the smaller cross section in the longitudinal direction of the drive shaft and compresses the drive shaft starting from the initial state, in the longitudinal direction of the drive shaft, and the region wall of the transition region between the tubular shaft portion having the larger cross section and the shaft portion having the smaller cross section forming a predetermined deformation point, a predetermined breaking point, or both;
   wherein the shaft portion having the smaller cross section comprises an insertion length that extends in the longitudinal direction of the drive shaft and is arranged outside the tubular shaft portion having the large cross section when the drive shaft is in the initial state
   wherein the shaft portion having the smaller cross section is pushed over the insertion length thereof into the tubular shaft portion having the large cross section when the drive shaft is compressed, thus deforming or breaking the region wall of the transition region arranged between the tubular shaft portion having the large cross section and the shaft portion having the smaller cross section;
   wherein the insertion length of the shaft portion having the smaller cross section is provided with a cross-section widening that is molded into the shaft portion having the smaller cross section over a partial length of the insertion length;
   wherein the cross-section widening of the insertion length has a cross section that is larger than a cross section of a remaining length of the insertion length of the shaft portion having the smaller cross section, the remaining length of the insertion length of the shaft portion having the smaller cross section extending in the longitudinal direction of the drive shaft on the side of the cross-sectional widening of the insertion length remote from the tubular shaft portion having the large cross section when the drive shaft is in the initial state; and wherein the shaft portion having the smaller cross section is guided inside the tubular shaft portion having the large cross section in a direction of movement by the cross-sectional widening of the insertion length molded into the shaft portion having the smaller cross section when the tubular shaft portion having the large cross section and the shaft portion having the smaller cross section move relative to one another when the drive shaft is compressed.

2. The drive shaft according to claim 1, wherein the shaft portion having the smaller cross section is tubular at least in a region of the cross-sectional widening of the insertion length and comprises a portion wall that extends in the longitudinal direction of the drive shaft and into which the cross-sectional widening of the insertion length of the shaft portion having the smaller cross section is molded.

3. The drive shaft according to claim 1, wherein the cross-sectional widening of the insertion length of the shaft portion having the smaller cross section is molded into the shaft portion having the smaller cross section by rotary swaging.

4. The drive shaft according to claim 1, wherein the region wall of the transition region between the tubular shaft portion having the large cross section and the shaft portion having the smaller cross section is curved towards an inside of the drive shaft when the drive shaft is in the initial state.

5. The drive shaft according to claim 1, wherein the tubular shaft portion having the large cross section has a circular cross section with an internal diameter (D) and the cross-sectional widening of the insertion length of the shaft portion having the smaller diameter has a circular cross section having an external diameter (d), and wherein a ratio of external diameter (d) of the cross-sectional widening of the insertion length of the shaft portion having the smaller cross section to the internal diameter (D) of the tubular shaft portion having the larger cross section is at least 0.715 and at most 0.958.

6. The drive shaft according to claim 1, wherein the drive shaft is configured as a Cardan shaft.

7. A method for manufacturing a drive shaft for motor vehicles, in which a plastically deformable tubular shaft blank is formed, thus forming a tubular shaft portion having a large cross section, a shaft portion having a smaller cross section than the tubular shaft portion having the large cross section, which follows the tubular shaft portion having the large cross section in a longitudinal direction of the drive shaft when the drive shaft is in an initial state, and a transition region provided between the tubular shaft portion having the large cross section and the shaft portion having the smaller cross section, the method comprising the steps of:

producing the transition region to include a region wall that interconnects the tubular shaft portion having the large cross section and the shaft portion having the smaller cross section and that forms a predetermined deformation point or a predetermined breaking point under action of a longitudinal force that acts on the tubular shaft portion having the large cross section or on the shaft portion having the smaller cross section in the longitudinal direction of the drive shaft and compresses the drive shaft starting from the initial state;

producing the shaft portion having the smaller cross section to have an insertion length which extends in the longitudinal direction of the drive shaft and is arranged outside the tubular shaft portion having the large cross section when the drive shaft is in the initial state and over which the shaft portion having the smaller cross section is pushed into the tubular shaft portion having the large cross section in an event of a movement performed by the tubular shaft portion having the large cross section and the shaft portion having the smaller cross section relative to one another in the longitudinal direction of the drive shaft when the drive shaft is compressed, thus deforming or breaking the region wall of the transition region arranged between the tubular shaft portion having the large cross section and the shaft portion having the smaller cross section; and molding a cross-sectional widening into the insertion length of the shaft portion having the smaller cross section over a partial length of the insertion length, wherein a cross section of the cross-sectional widening of the insertion length is larger than a cross section of a remaining length of the insertion length of the shaft portion having the smaller cross section, which remaining length extends in the longitudinal direction of the drive shaft on a side of the cross-sectional widening remote from the tubular shaft portion having the large cross section when the drive shaft is in the initial state, wherein the cross-sectional widening of the insertion length so molded guides the shaft portion having the smaller cross section inside the tubular shaft portion having the large cross section in a direction of movement when the tubular shaft portion having the large cross section and the shaft portion having the smaller cross section move relative to one another when the drive shaft is compressed.

8. The method according to claim 7, wherein the step of molding the cross-sectional widening of the insertion length of the shaft portion having the smaller cross section into the shaft portion having the smaller cross section is carried out at a same time as a remaining portion of the shaft portion having the smaller cross section is produced, at a same time as the production of the transition region between the tubular shaft portion having the large cross section and the shaft portion having the smaller cross section, or both.

9. The method according to either claim 7, further comprising swaging a tubular blank portion of the deformable tubular shaft blank to produce the shaft portion having the smaller cross section, the cross-sectional widening of the insertion length of the shaft portion having the smaller cross section, or both.

10. The method according to claim 9, wherein producing the transition region between the tubular shaft portion having the large cross section and the shaft portion having the smaller cross section includes producing a region wall that interconnects the tubular shaft portion having the large cross section and the shaft portion having the smaller cross section by rolling a relevant region of the tubular shaft blank.

* * * * *